United States Patent [19]

Nishikawa

[11] Patent Number: 5,024,157
[45] Date of Patent: Jun. 18, 1991

[54] SHOCK DETECTING DEVICE
[75] Inventor: Masumi Nishikawa, Toyoake, Japan
[73] Assignee: Aisin Seiki Kabushiki Kaisha, Kariya, Japan
[21] Appl. No.: 492,750
[22] Filed: Mar. 13, 1990
[30] Foreign Application Priority Data Mar. 23, 1989 [JP] Japan .................................. 1-71567

[51] Int. Cl.⁵ .......................................... F42C 15/24
[52] U.S. Cl. .................................. 102/252; 180/282; 200/61.53
[58] Field of Search ...................... 280/734; 180/282; 102/247, 275, 274, 252, 253, 254, 272; 200/61.53, 61.45 R, 61.45 M, 61.48, 61.50; 73/514; 116/203; 60/635, 636

[56] References Cited

U.S. PATENT DOCUMENTS

| 2,216,364 | 10/1940 | Dezzani | 200/61.48 |
| 3,407,667 | 10/1968 | Doeringsfeld | 200/61.45 R |
| 3,436,499 | 4/1969 | Butts | 200/61.5 |
| 4,666,182 | 5/1987 | Breed | 280/734 |
| 4,864,086 | 9/1989 | Akiyama et al. | 180/282 |
| 4,889,068 | 12/1989 | Tabata et al. | 180/282 |
| 4,938,140 | 7/1990 | Kinoshita et al. | |

FOREIGN PATENT DOCUMENTS 314716  9/1917  Fed. Rep. of Germany ...... 102/252

Primary Examiner—Charles A. Marmor
Assistant Examiner—Karin Tyson
Attorney, Agent, or Firm—Finnegan, Henderson, Farabow, Garrett and Dunner

[57] ABSTRACT

A shock detecting device having a housing, a weight disposed within the housing and rotatably slidable in response to an external shock. A cam is formed on the weight for engaging or disengaging the firing lever by the rotational sliding of the weight. A spring is interposed between the housing and firing lever for urging constantly the firing lever in the rotatable direction.

10 Claims, 2 Drawing Sheets

SHOCK DETECTING DEVICE

BACKGROUND OF THE INVENTION

1. Field of the Invention

This invention relates to a shock detecting device; and more particularly, to a shock detecting device which mechanically ignites without electricity an ignition element for use as a starting sensor of an anti-shock safety system, such as an air-bag or a seatbelt tensioner, for example.

2. Description of Related Art

A conventional shock detecting device of the above type, is disclosed in Japanese Patent Laid Open No. 60 (1985) -248456. In this publication, the movement of a sensing weight causes a rod to be depressed and rotated against an urging force. The rotation of the rod in turn rotates a rotatable shaft. Disengagement of an ignition pin upon rotation of the rotatable shaft permits the ignition pin to be moved by an urging force of a spring.

However, in the above-mentioned publication the ignition pin engages and disengages the shaft by the rotation thereof, so that the rotatable shaft and the ignition pin engage each other at one side. Accordingly, the ignition pin is supported slightly inclined during movement because of the urging force of the spring. After the ignition pin disengages the rotatable shaft, a smooth sliding of the ignition pin is not obtained, because the ignition pin interacts with or touches the housing during movement.

BRIEF SUMMARY OF THE INVENTION

It is an object of the present invention to reliably and stably maintain a firing lever of a shock detecting device in a cocked rotational position.

It is another object of the present invention to obtain a smooth rotational operation of the firing lever in response to a shock condition.

It is further an object of the present invention to securely maintain engagement of the firing lever and a cam portion of the shock detecting device in the absence of external shock.

Additional objects on advantages of the invention will be set forth in part in the description which follows, and in part will be obvious from the description, or may be learned by practice of the inventions.

To achieve the objects and in accordance with the purpose of the invention, as embodied and broadly described herein, the shock detecting device of the present invention comprises, a housing; a firing lever pivotably mounted in the housing to rotate in a first direction from a cocked to a fired position; a weight including a cam rotatably and slidably mounted in the housing, the cam engaging the firing lever when in a cocked position and disengaging the firing lever to permit rotation of the firing lever to the fired position in response to the rotation and sliding of the weight in response to an external shock; and urging means interposed between the firing lever and the housing for constantly urging rotation of the firing lever in the first direction to the fired position.

When the firing lever is in engagement with the cam portion of the weight, the position of the firing lever relative the cam is maintained. Therefore, the firing lever is stable in the cocked position, and after disengagement of the firing lever and the cam, the firing lever is not interfaced or in contact with the housing. Accordingly, smooth rotation of the firing lever in the first direction to the fired position.

DETAILED DESCRIPTION OF THE PREFERRED EMBODIMENT

Figure 1:
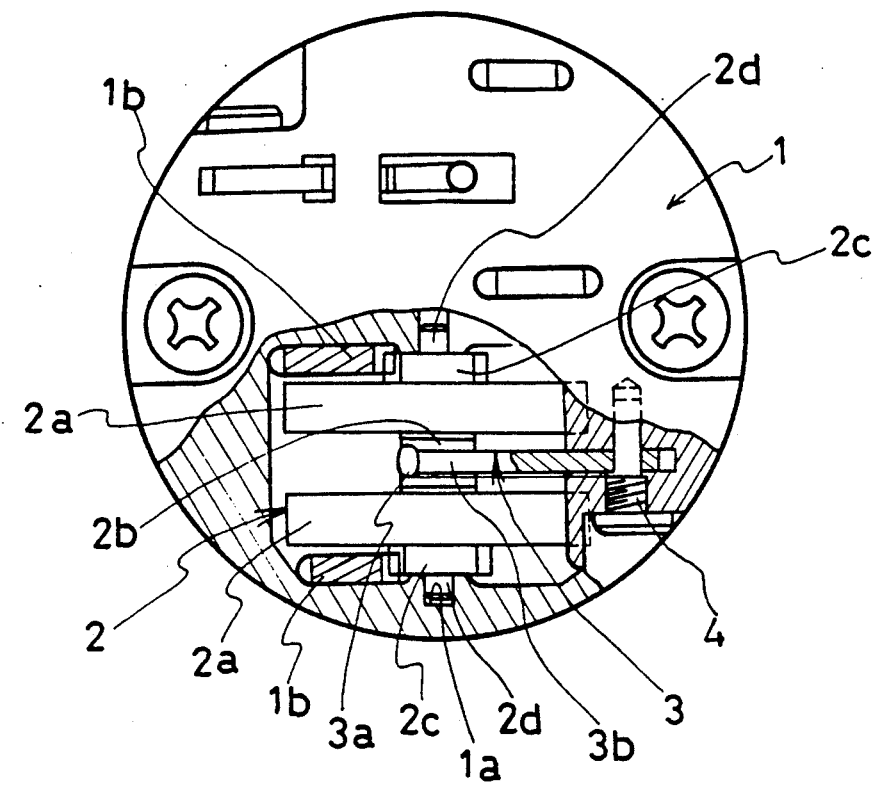
FIG. 1 is a plan view in partial cut-away form to show a portion of the interior of a shock detecting device constructed according to the present invention.

As shown in FIGS. 1 to 4, a weight 2 is disposed within a housing 1. Weight 2 is provided with a pair of spaced circular plate shape portions 2a of large diameter. Weight 2 has a cam portion 2b formed between the large diameter circular plate shaped portions 2a. Weight 2 has concentrically disposed pinion gear portions 2c formed on an outside radial surface of each of the large diameter circular plates 2a, and concentrically disposed shaft portions 2d formed on an outer radial surface of each of the pinion gear portions 2c. Housing 1 has spaced oppositely disposed and aligned linear grooves 1a into which respective shaft portions 2d of weight 1 slidably fit. Rack gear portions 1b are disposed within housing 1 so as to fixedly mesh with respective pinion gears 2c. The grooves 1a, into which the ends of shaft 2d slidably fit are aligned with rack gears 1b. Therefore, weight 2 is rotatably and slidably supported in the grooves 1a of housing 1. Rack gears 1b may be integrally formed as a single unitary structure with housing 1, or fixedly attached to the housing by means such as welding, for example.

As heretofore mentioned, weight 2 is provided with larger diameter circular plates 2a, so that the moment of inertia is enlarged, and the weight becomes difficult to actuate in response to very short time shocks, which may occur while traveling over a rough road, or the like. Thus, false operation of the shock detecting device is prevented. Further, actuation can be made to occur as required, because of a particular shape of weight 2. However, this requires not only manufacturing accuracy, but also special material characteristic, so that actuation does not change because of temperature change; making it difficult to obtain stability of performance.

Firing lever 3 is rotatably supported within housing 1 by a pin 4. Disposed on opposite sides of the firing lever are a pair of axially spaced weight members. A firing pin 3a is formed at a top end portion of the firing lever 3 and strikes a detonating chamber 5 in response to rotation of firing lever 3. Firing lever 3 is provided with an engaging edge portion 3b which normally engages cam 2b; and the rotation of the firing lever 3 about pin 4 is prevented by engagement of the cam 2b with the engaging edge portion 3b of firing lever 3. Hook portions 1c, and 3c are formed on the housing 1 and the firing lever 3 respectively. Firing lever 3 is constantly urged by a spring 6 interposed between hook portions 1c and 3c in a direction so that its firing pin 3 strikes detonating chamber 5. Therefore, spring 6 maintains both the position of the weight 2 in the housing, and provides the rotational urging force of the firing lever 3 after disengagement of cam portion 2b with engaging edge portion 3b.

As above mentioned, firing lever 3 is supported in a cocked condition by pin 4 and cam 2b of weight 2; that is, it is balanced or stabilized between weight 2, namely, the dead load of weight 2, and the urging force of spring 6 between spaced opposing sides of weight 2 upon engagement of the cam 2b and the engaging edge portion 3b of the firing lever. Accordingly, firing lever 3 is supported with stability against the rotational movement or location, and the firing lever 3 does not interact or touch the housing 1 upon the rotation of the lever disengagement of cam 2b and engaging edge portion 3b. As a result, smooth rotation of firing lever 3 is obtained.

Two sets of the shock detecting device are preferably provided so as to have point symmetry, and to permit equalization of an input of the inertia load upon assembling on a steering handle pad, etc. This redundancy therefore improves the operation in an optimum manner.

Figure 2:
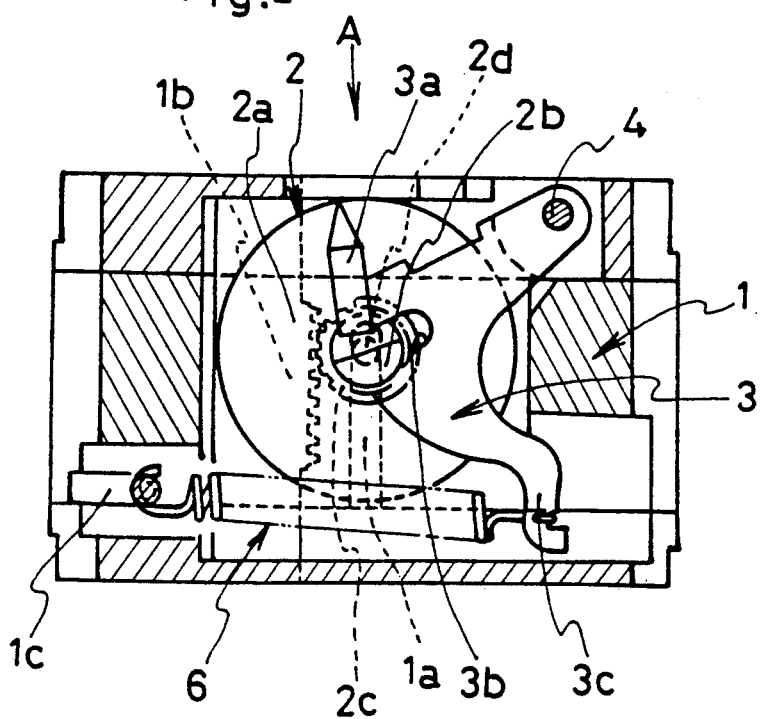
FIG. 2 shows a sectional view in elevation of the shock detecting device of FIG. 1.
Figure 3:
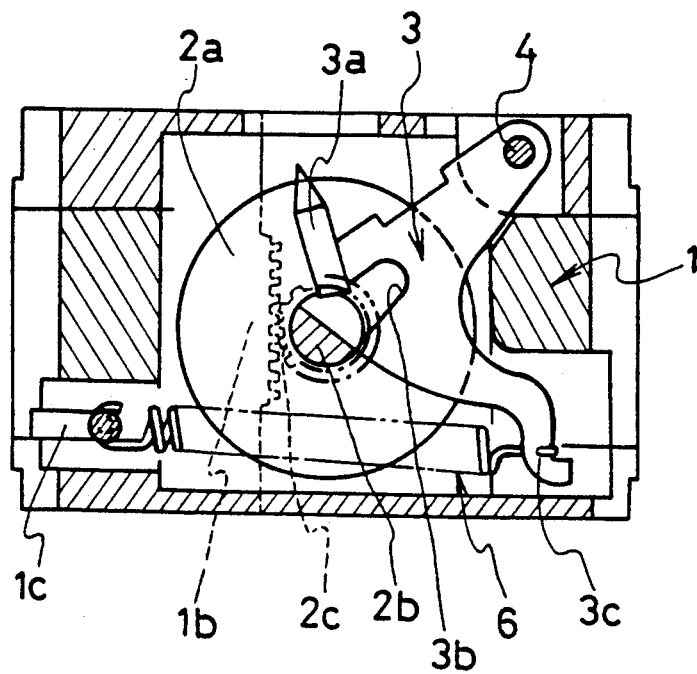
FIG. 3 is a view similar to FIG. 2, illustrating the position of the cam portion and the firing lever just prior to the disengagement of the cam portion and the firing lever of the device of the present invention.
Figure 4:
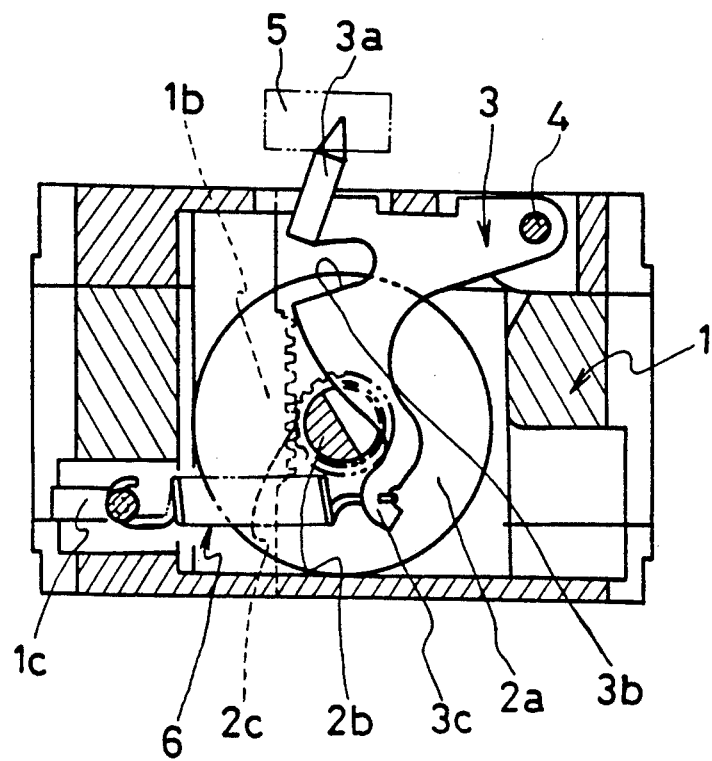
FIG. 4 is a view similar to FIG. 3 illustrating the position of the cam portion and the firing lever of the device of the present invention after disengagement of the firing lever and the cam portion.

In case shock is applied from a direction as shown in FIG. 2, movement of shaft 2d is guided by grooves 1a. As shown in FIG. 3, the meshing of pinion gears 2c with a respective rack gear 1b causes weight 2, and cam 2b to rotate while sliding in grooves 1a in response to the inertia force of the external shock. Disengagement of cam 2b and the engaging edge portion 3b of the firing lever occurs in response to the rotation and sliding of weight 2, along rack gears 1b as shown in FIG. 4. Accordingly, the firing lever 3 rotates on axis pin 4 in response to the urging force of spring 6, and firing pin 3a strikes detonating chamber 5.

As above mentioned, engagement between cam 2b and the engaging edge portion 3b is released by the rotational sliding of the weight. Thus, the length of the engaging surface of cam 2b with the engaging edge portion 3b, or in other words, the linear distance weight 2 must rotatably travel in groove 1a can be adjusted to the optimum extent. Accordingly, the engagement between cam 2b and the engaging edge portion 3b can be reliably maintained, and disengagement of cam 2b and engaging edge portion 3b does not occur, because of vibration, to falsely cause release of the firing lever or fail to operate in response to a proper shock.

In summary, and according to the present invention, the shock detecting device comprises the housing 1, with weight 2 disposed within housing 1 mounted to rotatably slide in response to an external shock, firing lever 3 is mounted to rotatably pivot about housing 1, cam portion 2b has a semicircular shape formed on weight 2 which is engaged with or disengaged from firing lever 3 in accordance with the rotational sliding of weight 2, and spring 6 is interposed between the housing 1 and firing lever 3 for urging constantly the firing lever in the rotatable direction.

With the above-described construction, firing lever 3 can be reliably held in cocked position without slipping, and firing lever 3 is prevented from interacting or touching the housing 1 during rotation of firing lever 3 after disengagement, thereby obtaining a smooth operation of the firing lever. Further, disengagement between cam portion 2b and firing lever 3 occurs upon the rotational sliding of weight 2. Thus, the distance that weight 2 travels while in engagement with cam 2b can be adjusted over a large range to maintain a reliable engaging state. As a result, disengagement between cam 2b and firing lever 3 generated by the vibration can be prevented, as well as the failure to operate because of vibration, also can be prevented.

While a particular embodiment of the invention has been shown and described, it will be obvious to those skilled in the art that the various changes and modifications may be made without departing from the invention in its broader aspects and the appended claims are intended to cover all such changes and modifications that fall within the true spirit and scope of the invention.

What is claimed is:

1. A shock detecting device, comprising:
   a housing;
   a firing lever pivotably mounted in the housing to rotate in a first direction from a cocked to a fired position;
   urging means interposed between the firing lever and the housing for constantly urging rotation of the firing lever in the first direction to the fired position; and
   a weight, including a cam, rotatably and slidably mounted in the housing, said weight being caused to rotate and slide in response to an external shock which exceeds a predetermined amount of force, the cam engaging the firing lever when in a cocked position and disengaging the firing lever to permit rotation of the firing lever in the first direction to the fired position in response to the rotation and sliding movement of the weight in response to an external shock.

2. The shock detecting device of claim 1, wherein the cam has an arcuate engaging surface of approximately 180°.

3. The detecting device of claim 1 wherein the urging means is a spring connecting the firing lever to the housing.

4. A shock detecting device, comprising:
   a housing having a pair of spaced opposing sidewalls with aligned elongated guide means at the pair of sidewalls;
   a firing lever pivotably mounted in the housing to rotate about an axis extending transverse to the sidewalls, said firing lever being spaced from the pair of sidewalls and rotatable in a first direction from a cocked to a fired position;
   urging means interposed between the firing lever and the housing for constantly urging rotation of the firing lever in the first direction;
   a weight including a cam for engaging the firing lever to hold the firing device in a cocked position when in a first rotational position and for releasing the firing lever when in a second rotational position, the weight being slidable along the guide means in response to an external shock; and
   means for rotating the cam to the second position in response to the sliding of the weight along the guide means.

5. The device of claim 4, wherein the guide means are a pair of elongate grooves formed in a respective sidewall of the housing and the weight has a shaft which is slidably received in the grooves.

6. The device of claim 4, wherein the guide means is a pair of linear grooves.

7. The device of claim 4, wherein the means for rotatably and slidably mounting the cam includes a pinion gear rotatable with the cam, and the housing further includes a rack gear mounted therein and meshed with the pinion gear and extending substantially parallel to the guide means.

8. The device of claim 4, wherein the weight includes a pair of axially spaced members disposed on opposite sides of the firing lever.

9. The device of claim 4, wherein the firing lever includes an open slot having a cam engaging edge spaced from the axis, and the cam has an arcuate surface for engaging said edge when in a cocked position, the cam means being disposed to rotate along said edge to disengage the firing lever in response to an external shock.

10. The device of claim 7, wherein the rack gear is formed integral with at least a portion of the housing.

* * * * *